United States Patent [19]

Henke

[11] 4,393,031

[45] Jul. 12, 1983

[54] PROCESS FOR EFFICIENTLY REMOVING OXIDES OF NITROGEN FROM EXHAUST GAS

[76] Inventor: Werner Henke, P.O. Box 51932 Oil Center Station, Lafayette, La. 70501

[21] Appl. No.: 255,824

[22] Filed: Apr. 20, 1981

Related U.S. Application Data

[63] Continuation of Ser. No. 13,892, Feb. 22, 1979, abandoned, and a continuation of Ser. No. 149,281, May 12, 1980, abandoned.

[51] Int. Cl.$^3$ .................. B01J 8/00; C01B 21/00
[52] U.S. Cl. ................. 423/239; 423/213.7; 423/351; 422/172
[58] Field of Search ............... 423/213.7, 239, 351; 60/299, 301, 303; 422/172, 173

[56] References Cited

U.S. PATENT DOCUMENTS

| | | | |
|---|---|---|---|
| 3,232,885 | 2/1966 | Henke | 423/351 X |
| 3,767,764 | 10/1973 | Dolbear | 423/213.2 |
| 3,810,361 | 5/1974 | Weaving et al. | 60/301 |
| 4,056,600 | 11/1977 | Skvortsov et al. | 423/239 |
| 4,087,250 | 5/1978 | Laue et al. | 423/239 X |

Primary Examiner—O. R. Vertiz
Assistant Examiner—Gregory A. Heller
Attorney, Agent, or Firm—Ned L. Conley; Murray Robinson; David Alan Rose

[57] ABSTRACT

A system for removal of oxides of nitrogen from the waste gas produced by various combustion processes discloses thoroughly mixing the waste gas with ammonia by means of a static mixing element and then passing the resultant mixture through a catalytic reactor. The ammonia may be supplied by reacting a portion of the waste gas with natural gas in the presence of a catalyst.

5 Claims, 1 Drawing Figure

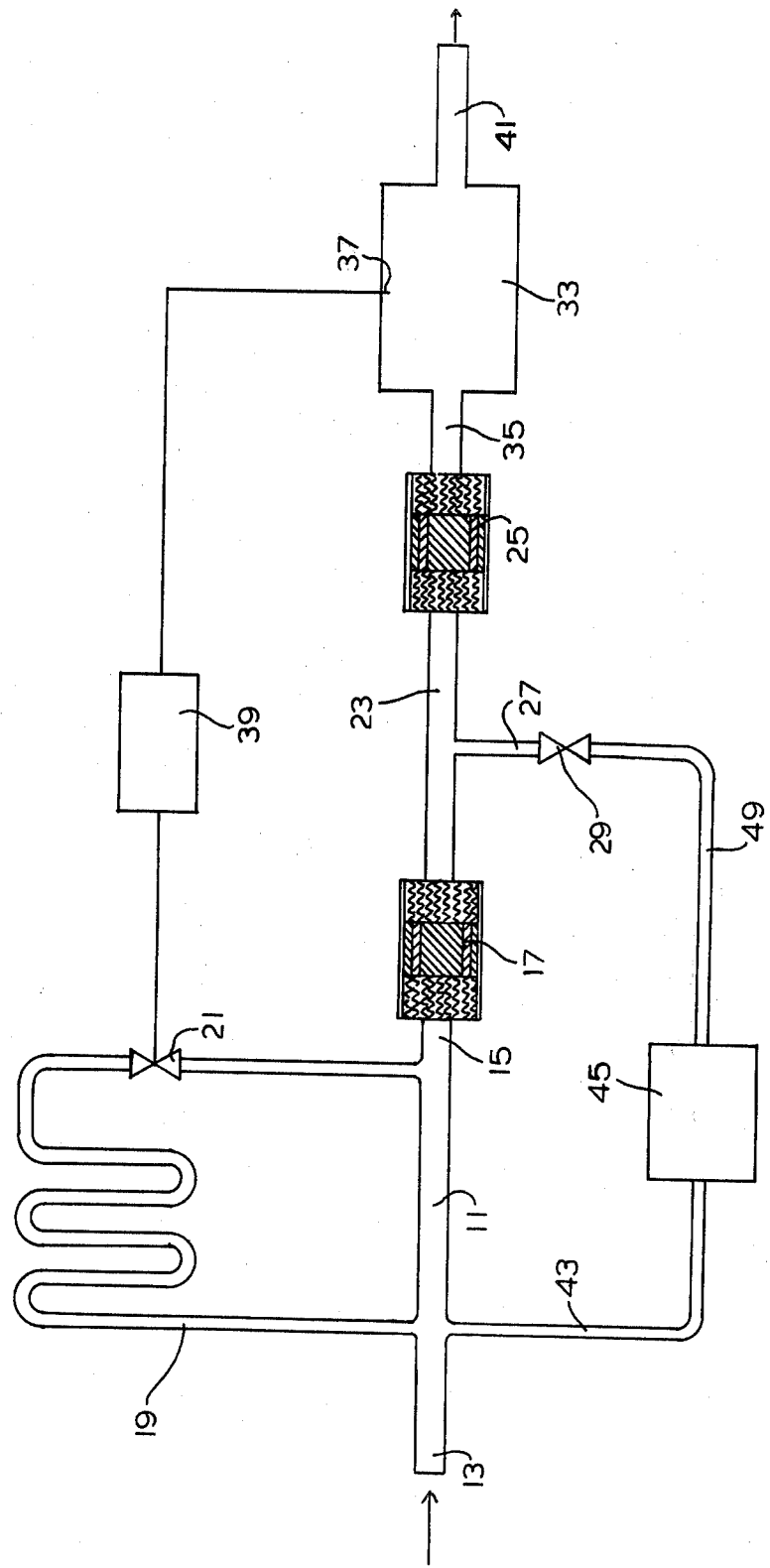

PROCESS FOR EFFICIENTLY REMOVING OXIDES OF NITROGEN FROM EXHAUST GAS

This is a continuation of application Ser. No. 13,892 filed Feb. 22, 1979 now abandoned, and of application Ser. No. 149,281, filed May 12, 1980 now abandoned.

BACKGROUND OF THE INVENTION

1. Related Application

This application covers a method that was nonelected for prosecution in applicant's prior application, Ser. No. 808,964, which was abandoned before this application was filed.

2. Field of the Invention

The present invention relates to an improved system for removing oxides of nitrogen from waste gas produced by various combustion processes.

3. Background of the Prior Art

When air consisting of nitrogen ($N_2$) and oxygen ($O_2$) is fed into a combustion process such as a boiler, an engine, or a turbine, an exhaust consisting primarily of $N_2$, carbon dioxide ($CO_2$) and water $H_2O$) is produced. Lesser products of the process are carbon monoxide (CO), unburned $O_2$, unburned fuel, and oxides of nitrogen $NO_x$. These oxides of nitrogen are undesirable because they are both corrosive and a source of air pollution. As a result, a substantial amount of research has centered about techniques for reducing the amount of $NO_x$ present in these waste gases. See: Bartok, et al, Control of $NO_x$ Emissions from Stationary Sources, Chemical Engineering Progress 64 (February 1971); Adlhart, et al, Processing Nitric Acid Tail Gas, Chemical Engineering Progress 73 (February 1971); Newman, Nitric Acid Plant Pollutants, Chemical Engineering Progress 79 (February 1971). In general, these techniques have involved either modifying the combustion process itself so as to reduce the amount of $NO_x$ produced or treating the waste gases whereby the $NO_x$ produced is removed or converted.

For accomplishing the latter of these techniques, $NO_x$ removal, a commonly practiced process is catalytic reduction. This process, described in all the above mentioned articles, is taught by, e.g., U.S. Pat. Nos. 3,846,981 to Paczkowski, issued Nov. 12, 1974; 3,826,810 to Lawson, issued July 30, 1974; 3,449,063 to Griffing, et al., issued June 10, 1969; 3,279,884 to Nonnenmacher, et al., issued Oct. 18, 1966; and 2,975,025 to Cohn, et al., issued Mar. 14, 1961.

Catalytic reduction has been accomplished in the prior art by adding a fuel gas, or reducing agent, to the waste gas in the presence of a catalyst (See, e.g., Nonnenmacher, et al., supra; Cohn, et al., supra; U.S. Pat. No. 3,232,885, issued Feb. 1, 1966 to Henke; Canadian Pat. No. 668,384, issued Aug. 13, 1963 to Henke; and Canadian Pat. No. 787,836, issued June 18, 1968 to Henke) or by merely adding the reducing agent to the gas at any point prior to passing the gas over the catalyst (See, Griffing, et al., supra). Catalytic reduction may be accomplished non-selectively, using a reducing agent such a methane, or selectively, using a reducing agent such as ammonia. In non-selective reduction, the agent reacts with gases other than $NO_x$, especially oxygen as well as with $NO_x$. In selective reduction, the agent reacts almost exclusively with $NO_x$. Therefore, a greater quantity of reducing agent is necessary in non-selective reduction than is necessary in selective reduction. Furthermore, the reaction that occurs between the agent and oxygen in non-selective reduction produces a tremendous amount of heat that can destroy the catalyst used and can result in increased equipment and control costs.

In spite of these disadvantages, non-selective catalytic reduction has been practiced, especially in treatment of nitric acid plant exhaust gases, more commonly than has selective reduction (See, Newman, supra, at 81) because the cost of ammonia in the past has far exceeded the cost of methane.

Over the past few years, however, the cost differential between methane and ammonia has decreased substantially thus increasing the efforts to improve the process of selective catalytic reduction. These efforts have centered about finding suitable catalysts (See, Cohn, et al., supra, teaches use of platinum group metals; Nonnenmacher, et al., supra, teaches use of vanadium, molybdenum and tungsten; Griffing, et al., supra, teaches use of copper in oxide form) and determining optimum process conditions (See, Cohn, et al., supra, teaches a preferred range of approximately 320° F. to 575° F.; Nonnenmacher, et al., supra, teaches a preferred range of approximately 390° F. to 662° F.; Griffing, et al., supra, teaches a preferred range of 600° F. to 800° F.). In spite of these efforts, selective reduction of $NO_x$, especially in nitric acid plants, has not been very successful (Bartok, et al., supra, at 70). As a result, in many locales, it is still more economical to use low efficiency non-selective reduction for removal of $NO_x$ from exhaust gases using methane as a fuel.

SUMMARY OF THE INVENTION

The objective of this invention is to improve the effectiveness and efficiency of selective reduction of $NO_x$ in combustion process waste gases. It has been found that such reduction can be accomplished more effectively and efficiently by thoroughly mixing the ammonia with the waste gas so that the ammonia-gas combination is thermally and compositionally homogeneous prior to passing the gas over a catalyst. The step of thoroughly mixing the ammonia and the waste gas prior to catalytic reaction, a step unknown in the prior art, produces an unexpected improvement in $NO_x$ removal because gases generally flow turbulent (R. M. Rotty, INTRODUCTION TO GAS DYNAMICS 18 (John Wiley & Sons, Inc., 1962)), whereby it is assumed that the gas will be homogeneous upon entering the catalytic reactor without the added step of mixing.

Furthermore, this process may be made economically available in locales where the cost differential between ammonia and methane is high by directing a side-stream of the waste gas into the methane-fueled catalytic reactor of the process for producing inert gas disclosed and described in U.S. Pat. No. 3,232,885. As noted at column 6, line 50, through column 7, line 28, of that patent, the product of the reaction described therein includes ammonia, the quantity of ammonia being almost directly proportional to the amount of methane introduced into the reactor. The product of the reaction is then thoroughly mixed with the remainder of the exhaust gas and the resultant homogeneous mixture is fed into a second catalytic reactor. In this way, at least a portion of the exhaust gas is selectively reduced thus making a methane-fueled process more efficient and economic.

BRIEF DESCRIPTION OF THE DRAWINGS

The drawing is a schematic diagram showing the arrangement of apparatus according to the preferred embodiment of the invention.

DETAILED DESCRIPTION OF THE PREFERRED EMBODIMENT

Referring to the drawing, the system of the preferred embodiment includes inlet conductor 11 connected to one end 13 to the exhaust of a combustion process and connected at the other end 15 to input of thermal mixing chamber 17. Cooling coil 19 having control valve 21 therein is connected in parallel over a portion of conductor 11.

Thermal mixing chamber 17 preferably comprises a static mixing element such as those manufactured by Koch Engineering Co., Inc.

The outlet of thermal mixing chamber 17 is connected to mixing conductor 23 which leads to the input of $NH_3$/gas mixing chamber 25. Ammonia conductor 27, having valve 29 therein, connects an ammonia source to mixing conductor 23 at a point between thermal mixing chamber 17 and $NH_3$/gas mixing chamber 25.

Like thermal mixing chamber 17, $NH_3$/gas mixing chamber 25 preferably comprises a static mixing element such as those manufactured by Koch Engineering Co., Inc.

The ammonia source may be an ammonia pipeline or other conventional source of ammonia. As shown in the Figure, however, the ammonia may be generated as part of the process itself. According to such a technique, side-stream input conductor 43 connects between conductor 11 and an input of a process for producing ammonia from combustion process exhaust gas, such a process being identified as system 45. The output of system 45 is connected to ammonia conductor 27 by side-stream output conductor 49.

A process for producing ammonia from combustion process exhaust gas is described in detail is U.S. Pat. No. 3,232,885 entitled "EMTHOD OF PRODUCING AN INERT GAS" and issued to Henke on Feb. 1, 1966 (referred to hereinafter as "Henke '885"). The description of Henke '885 is incorporated herein by reference. Referring to FIG. 2 of Henke '885, system 45 of the present application includes the portion of the Henke '885 system from conductor 41, representing the input of system 45, to the conductor between cooling coil 60 and three-way valve 62, such conductor representing the output of system 45. Such portion of the system is described most particularly in Henke '885 from column 4, line 69, to column 5, line 71; from column 6, line 50, to column 7, line 28; from column 9, line 11, to column 9, line 31; from column 10, line 8, to column 10, line 45; and the claims.

The outlet of $NH_3$/gas mixing chamber 25 is connected to the input of catalytic reactor 33 by means of reactor conductor 35. Within catalytic reactor 33 is a catalyst that catalyzes the reduction of $NO_x$ to gaseous nitrogen in the presence of ammonia, preferably a platinum group metal, although the catalyst may also be an oxide of vanadium, molybdenum, tungsten, or copper, which can be in any of the number of forms known in the art.

Also within catalytic reactor 33 is temperature sensor 37 which connects to the input of valve control 39. The output of valve control 39 connects to control valve 21.

The combination of sensor 37 and valve control 39 is a thermal-to-mechanical transducer designed to open and close control valve 21 according to the temperature within termistors and thermocouples, and motors. Because the preferred reactor temperature is between 420° F. and 520° F., the transducer should operate such that valve 21 is closed when the reactor temperature is below 420° F. and open completely when the temperature is over 520° F.

The outlet of catalytic reactor 33 is connected to exhaust conductor 41 from which essentially $NO_x$ free gas is exhausted.

Operation of the described system includes applying hot gas (above 420° F.) to be processed to end 13 of conductor 11. A portion of the gas enters cooling coil 19. Because the initial temperature of the catalytic reactor is well below 420° F., control valve 21 is closed whereby the gas entering coil 19 is trapped therein.

A portion of the remainder of the gas flows into thermal mixing chamber 17 and is exhausted therefrom into mixing conductor 23.

The remainder of the gas flows through sidestream input conductor 43 into system 45 where the gas is converted into $N_2$, $CO_2$, $H_2O$ (steam), and $NH_3$. This product is then fed to mixing conductor 23 through side-stream output conductor 49, valve 29, and ammonia conductor 27. Valve 29 should be adjusted so that the amount of ammonia added to the evenly heated gas exhausted from mixing chamber 17 in mixing conductor 23 is slightly above stoichiometric proportion. If system 45 is the process described in Henke '885, the amount of ammonia present at the input of valve 29 will be in almost direct proportion to the amount of natural gas introduced into the reactors of the Henke '885 system. Therefore, it may be necessary to increase natural gas flow into system 45 in order to be certain than an above stoichiometric amount of ammonia will be available at valve 23.

The ammonia-gas combination is then fed into $NH_3$/gas mixing chamber 25 where the combination is thoroughly mixed. The homogeneous mixture then enters catalytic reactor 33 where the $NO_x$ in the gas reacts with the ammonia to form nitrogen and water. The resultant inert gas is exhausted from the system through exhaust conductor 41.

As the hot ammonia-gas mixture enters and reacts within catalytic reactor 33 the temperature therein increases rapidly. When the temperature reaches and exceeds 420° F., control valve 21 is open allowing the cooled gas within cooling coil 19 to enter conductor 11. The cooled gas and the hot gas passing directly through conductor 11 are thoroughly mixed in thermal mixing chamber 17 whereby the gas exhausted from thermal mixing chamber is thermally homogeneous. As a result, cooler gas enters catalytic reactor 33 and the increase in temperature is decreased until a steady-state temperature between 420° F. and 520° F. is achieved.

It may be that in some instances, the waste gas of a combustion process will have a temperature less than 420° F. In such case, it is necessary to increase the temperature of the gas by preheating before applying the gas to the above described system.

Furthermore, it may be that the temperature of the product of system 45 is so high that even though valve 21 is fully opened, the temperature in catalytic reactor 33 will exceed 520° F. Such a possibility is great if the Henke '885 system is sued as system 45 since Henke '885 uses non-selective reduction which results in high product gas temperature. Referring to FIG. 2 of Henke '885, however, the product of the system may be reduced by closing valve 61 either partially or fully thus forcing at least some of the product gas through cooling coil 60. As a result, the temperature of the gas at the input to valve 27 will be lowered.

Although the above described system has been found to be most satisfactory and preferred, many variations are possible.

For example, the system may include only a single mixing element rather than two as set forth in the description of the preferred embodiment. For best results, the single element should be disposed between the point where the ammonia is added and the catalytic reactor. This assures the homogeneous nature of the mixture upon reaction.

Furthermore, any form of mixing device may be used in order to assure the homogeneity of the ammonia-gas mixture immediately prior to reaction.

These alternatives are merely exemplary of the possible changes or variations.

Because many and varying embodiments may be made within the scope of the inventive concept taught herein and because many modifications may be made in the embodiment described in detail herein in accordance with the requirements of the law, it should be understood that such details are to be taken as illustrative and not in a limiting sense.

I claim:

1. A process for the removal of nitrogen oxides from a hot waste gas of a temperature of at least 420° F. and containing nitrogen oxides, comprising:

dividing the waste gas into a first, second and third portion;

passing said third portion through a cooling loop;

adding a methane containing gas mixture to said second portion so as to convert part of said second portion into at least the amount of ammonia required for stoichiometric reaction with the nitrogen oxides in the waste gas;

combining said first, third and ammonia containing second portion;

thoroughly mixing said combination until said combination is substantially thermally and compositionally homogeneous by passing said combination through a static mixing element; and passing the thoroughly mixed combination over a catalyst that catalyzes the reduction of nitrogen oxides to gaseous nitrogen in the presence of ammonia.

2. A process for the removal of nitrogen oxides from a hot waste gas of a temperature of at least 420° F. and containing nitrogen oxides, comprising:

dividing the waste gas into a first, second and third portion;

passing said third portion through a cooling loop;

re-combining said first and third portion;

thoroughly mixing said re-combination until said recombination is thermally homogeneous by passing said re-combination through a first static mixing element;

adding a methane containing gas mixture to said second portion so as to convert part of said second portion into at least the amount of ammonia required for stoichiometric reaction with the nitrogen oxides in the waste gas;

combining said re-combined and thermally homogenized first and third portion with said ammonia containing second portion;

thoroughly mixing said second combination until said second combination is substantially thermally and compositionally homogeneous by passing said second combination through a second static mixing element; and passing the thoroughly mixed second combination over a catalyst that catalyzes the reduction of nitrogen oxides to gaseous nitrogen in the presence of ammonia.

3. The process recited in claim 1 or 2 wherein the catalyst is selected from the group consisting of a platinum group metal, vanadium oxide, molybdenum oxide, and tungsten oxide.

4. The process recited in claim 1 or 2 further comprising the step maintaining the temperature of the combination at between 420° F. and 520° F. during catalytic reduction of the nitrogen oxides by adjusting the bypass ratio of said third portion as against said first and second portions from between a maximum of less than 100% down to 0%.

5. The process of claim 4 further comprising the step of cooling said ammonia containing second portion prior to recombining it with said first and third portions in response to the temperature of the combination during the catalytic reduction.

* * * * *